US009135744B2

(12) United States Patent
Ho et al.

(10) Patent No.: US 9,135,744 B2
(45) Date of Patent: Sep. 15, 2015

(54) METHOD FOR FILLING HOLE-REGION AND THREE-DIMENSIONAL VIDEO SYSTEM USING THE SAME

(75) Inventors: Yo-Sung Ho, Gwangju (KR); Cheon Lee, Gwangju (KR)

(73) Assignee: KT CORPORATION, Gyeonggi-do (KR)

( * ) Notice: Subject to any disclaimer, the term of this patent is extended or adjusted under 35 U.S.C. 154(b) by 933 days.

(21) Appl. No.: 13/247,909

(22) Filed: Sep. 28, 2011

(65) Prior Publication Data

US 2012/0162395 A1    Jun. 28, 2012

(30) Foreign Application Priority Data

Dec. 28, 2010   (KR) ........................ 10-2010-0136916

(51) Int. Cl.
- *H04N 13/00* (2006.01)
- *H04N 13/04* (2006.01)
- *G06T 15/20* (2011.01)
- *G06T 15/40* (2011.01)

(52) U.S. Cl.
CPC .................. *G06T 15/20* (2013.01); *G06T 15/40* (2013.01); *H04N 13/0011* (2013.01); *H04N 13/0018* (2013.01)

(58) Field of Classification Search
None
See application file for complete search history.

(56) References Cited

U.S. PATENT DOCUMENTS

| 8,218,893 | B2 | 7/2012 | Lim et al. | |
| 2009/0190852 | A1* | 7/2009 | Lim et al. | ...................... 382/256 |
| 2010/0309292 | A1 | 12/2010 | Ho et al. | |
| 2011/0115886 | A1* | 5/2011 | Nguyen et al. | .................. 348/47 |

FOREIGN PATENT DOCUMENTS

| KR | 10-2009-0055803 A | 6/2009 |
| KR | 10-2009-0082782 A | 7/2009 |
| KR | 20100019927 A | 2/2010 |

* cited by examiner

*Primary Examiner* — Sath V Perungavoor
*Assistant Examiner* — William Adrovel
(74) *Attorney, Agent, or Firm* — IP Legal Services, LLC

(57) ABSTRACT

Method for filling a hole-region and a three-dimensional (3D) video system using the same. In order to synthesize an image, a plurality of images each having a different viewpoint may be obtained. By using depth maps of the obtained plurality of images, an intermediate virtual viewpoint image may be synthesized. After synthesizing, a hole-region in the intermediate virtual viewpoint image may be filled using a color image of the intermediate virtual viewpoint image, a mask image indicating the hole-region in the intermediate virtual viewpoint image, and a depth image of the intermediate virtual viewpoint image.

16 Claims, 6 Drawing Sheets

METHOD FOR FILLING HOLE-REGION AND THREE-DIMENSIONAL VIDEO SYSTEM USING THE SAME

CROSS REFERENCE TO PRIOR APPLICATIONS

The present application claims priority under 35 U.S.C. §119 to Korean Patent Application No. 10-2010-0136916 (filed on Dec. 28, 2010), which is hereby incorporated by reference in its entirety.

FIELD OF THE INVENTION

Apparatuses and methods consistent with the present invention relate to a method for filling a hole-region and a three-dimensional (3D) video system using the same.

BACKGROUND OF THE INVENTION

Lately, a three-dimensional (3D) display has been receiving greater attention. In order to produce and display a realistic 3D image, it may be necessary to obtain a large number of different viewpoint images. However, it is difficult to obtain different viewpoint images sufficient to produce a high quality 3D image due to limitations such as a bandwidth of a transmission channel. Accordingly, an intermediate virtual viewpoint image may be synthesized using at least one obtained viewpoint image. The intermediate virtual viewpoint image may be displayed with the obtained viewpoint images to produce a realistic 3D image from any viewpoint of a viewer. Such a technology has been referred to as view synthesis.

A typical 3D video system produces a 3D image mostly by using a depth image such as a depth map. Such a 3D video system may obtain a depth map of each viewpoint image and camera parameters as supplementary input data when obtaining images each having a different viewpoint. A typical 3D video system uses the supplementary input data including the depth map and the camera parameters to synthesize an intermediate virtual viewpoint image.

The intermediate virtual viewpoint image, synthesized by the typical 3D video system, may have a hole-region. The hole-region may be an occluded region that is newly revealed in the intermediate virtual viewpoint image when the intermediate virtual viewpoint image is synthesized using obtained different viewpoint images. Such a hole-region deteriorates a 3D image quality.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a virtual viewpoint image may be synthesized using images each having a different viewpoint.

In accordance with another aspect of the present invention, a hole-region of a virtual viewpoint image may be filled naturally using a depth image, a color image, and a mask image of the virtual viewpoint image.

In accordance with still another aspect of the present invention, a hole-region of a virtual viewpoint image may be filled using a depth value of each hole-pixel, depth values of pixels adjacent to a corresponding hole-pixel, and color values of pixels adjacent to a corresponding hole-pixel.

In accordance with an embodiment of the present invention, a method for filling a hole-region of an image is provided, the method including deciding a depth value of each hole-pixel included in the hole-region, determining a color value of each hole-pixel included in the hole-region, and reconstructing the hole-region by updating each hole-pixel based on respective decided depth values and respective determined color values.

In the deciding of the depth value of each hole-pixel, a smallest depth value may be selected from depth values of pixels adjacent to and within a desired distance from the respective hole-pixel, and the selected smallest depth value may be established as the decided depth value of the respective hole-pixel.

In the determining of the color value of each hole-pixel, the color value may be calculated based on the depth value of the respective hole-pixel and depth values and color values of pixels adjacent to the respective hole-pixel.

The color value may be determined by using a bilateral filter with a weight that changes according to a depth value difference between a respective hole-pixel and adjacent pixels and according to a distance between the respective hole-pixel and the adjacent pixels.

In accordance with another embodiment of the present invention, a method for synthesizing an image is provided, the method including obtaining a plurality of images each having a different viewpoint, synthesizing an intermediate virtual viewpoint image using depth maps of the obtained plurality of images, and filling a hole-region in the intermediate virtual viewpoint image using a color image of the intermediate virtual viewpoint image, a mask image indicating the hole-region in the intermediate virtual viewpoint image, and a depth image of the intermediate virtual viewpoint image.

The filling of the hole-region may include deciding a depth value of each hole-pixel included in the hole-region of the intermediate virtual viewpoint image, and calculating a color value of each hole-pixel included in the hole-region of the intermediate virtual viewpoint image using the decided depth values of the hole-pixels, depth values of pixels adjacent to the hole-pixels, and color values of the pixels adjacent to the hole-pixels.

In the deciding of the depth value of each hole-pixel, a smallest depth value may be selected from among depth values of pixels adjacent to and within a desired distance from a respective hole-pixel. The selected smallest depth value may be established as the decided depth value of the respective hole-pixel.

In the calculating of the color value of each hole-pixel, the color value of each hole-pixel may be determined by using a bilateral filter based on the decided depth value of the respective hole-pixel, depth values of pixels adjacent to the respective hole-pixel, color values of pixels adjacent to the respective hole-pixel, and a weighting factor that changes according to a depth value difference between the respective hole-pixel and the adjacent pixels and according to a distance between the respective hole-pixel and the adjacent pixels.

In the calculating of the color value of each hole-pixel, a comparatively larger weight may be applied to an adjacent pixel having a depth value substantially similar to a decided depth value of the respective hole-pixel, a comparatively smaller weight may be applied to an adjacent pixel having a depth value substantially different from a decided depth value of the respective hole-pixel, and a comparatively larger weight may be applied to an adjacent pixel that is located proximate to the respective hole-pixel.

The color value of each hole-pixel included in the hole-region may be determined by:

$$C(x, y) = \frac{\sum_{u \in \vec{u}} \sum_{v \in \vec{v}} W(u, v, \hat{d}) \cdot C(u, v)}{\sum_{u \in \vec{u}} \sum_{v \in \vec{v}} W(u, v, \hat{d})},$$

wherein C(x,y) may denote a color value of a respective hole-pixel, W(u, v, d̂) may denote a weight that varies according to a depth difference between the respective hole-pixel and adjacent pixels and a distance between the respective hole-pixel and the adjacent pixels, d̂ may denote a depth value of the respective hole-pixel, C(u,v) may denote color values of pixels adjacent to and within a desired distance from the respective hole-pixel, u may denote an x-coordinate value, v denotes a y-coordinate value, $\vec{u}$ may denote a set of x-coordinate values of pixels separated from a hole-pixel (x,y) in a hole-region at a distance r, and $\vec{v}$ may denote a set of y-coordinate values of pixels separated from the hole-pixel (x,y) in a hole-region at a distance r.

The weight W(u, v, d̂) may be determined by:

$$W(u, v, \hat{d}) = \exp\left(\frac{\|\hat{d}, D(u, v)\|^2}{2\sigma_D^2}\right) \exp\left(\frac{(x-u)^2 + (y-v)^2}{2\sigma_r^2}\right),$$

wherein x may denote an x-coordinate value of the respective hole-pixel, y may denote a y-coordinate value of the respective hole-pixel, D may denote a depth value difference between the respective hole-pixel and a pixel adjacent to the respective hole-pixel, r may denote a distance between the respective hole-pixel and the pixel adjacent to the hole-pixel, and σ may denote a standard deviation.

The color values of the pixels adjacent to the respective hole-pixel may be determined by:

$$C(u,v) = \alpha(u,v) \cdot I(u,v),$$

wherein α(u,v) may denote an alpha value of a pixel (u,v) adjacent to and within a desired distance from the respective hole-pixel, and I(u,v) may denote a color value of the pixel (u,v) adjacent to and within the desired distance from the respective hole-pixel.

In accordance with still another embodiment of the present invention, an apparatus may produce three dimension images. The apparatus may include an input unit, an image synthesizer, and a display unit. The input unit may be configured to obtain a plurality of images each having a different viewpoint. The image synthesizer may be configured to receive the obtained plurality of images from the input unit, synthesize an intermediate virtual viewpoint image using depth maps of the obtained plurality of images, and fill a hole-region in the intermediate virtual viewpoint image using a color image of the intermediate virtual viewpoint image, a mask image indicating the hole-region in the intermediate virtual viewpoint image, and a depth image of the intermediate virtual viewpoint image. The display unit may be configured to display the intermediate virtual viewpoint image synthesized by the image synthesizer.

The image synthesizer may be configured to decide a depth value of each hole-pixel included in the hole-region of the intermediate virtual viewpoint image, and calculate a color value of each hole-pixel included in the hole-region of the intermediate virtual viewpoint image using the decided depth values of the hole-pixels, depth values of pixels adjacent to the hole-pixels, and color values of the pixels adjacent to the hole-pixels.

Furthermore, the image synthesizer may be configured to select a smallest depth value from among depth values of pixels adjacent to and within a desired distance from a respective hole-pixel, and establish the selected smallest depth value as the decided depth value of the respective hole-pixel.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
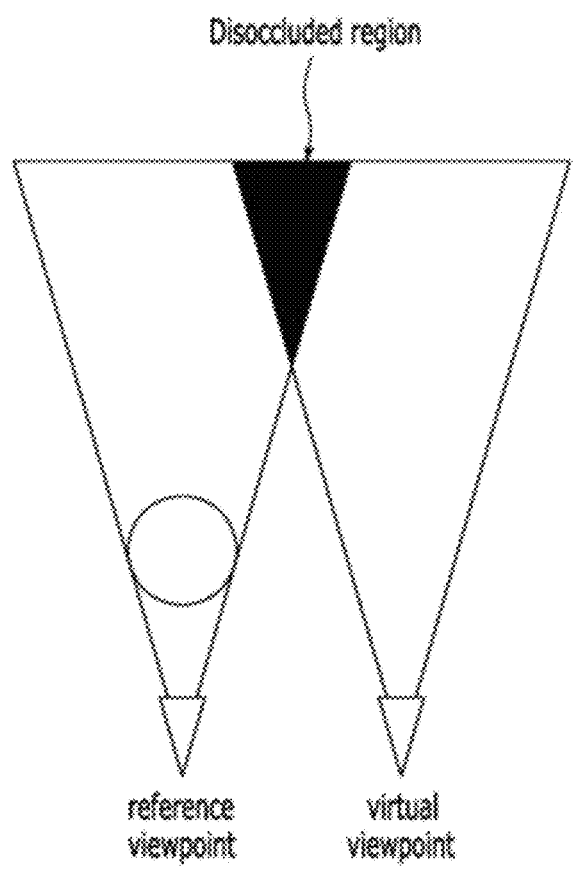
FIG. 1 illustrates a hole-region included in an intermediate virtual viewpoint image.

Reference will now be made in detail to embodiments of the present invention, examples of which are illustrated in the accompanying drawings, wherein like reference numerals refer to like elements throughout. The embodiments are described below, in order to explain the present invention by referring to the figures.

FIG. 1 illustrates a hole-region included in an intermediate virtual viewpoint image.

Referring to FIG. 1, some regions may be newly revealed in an intermediate virtual viewpoint image when the intermediate virtual viewpoint image is synthesized using reference images and supplementary data thereof such as a depth map. Such regions may be referred to as a disoccluded region. The disoccluded region may arise when a certain region, such as a previously occluded region, is uncovered in any reference view. Since the reference images do not have information on the disoccluded regions, the disoccluded regions become a hole-region. In order to synthesize a high quality intermediate virtual viewpoint image, it may be necessary to fill the hole-region. An image inpainting method may be used to fill such a hole-region of an intermediate virtual viewpoint image.

Figure 2:
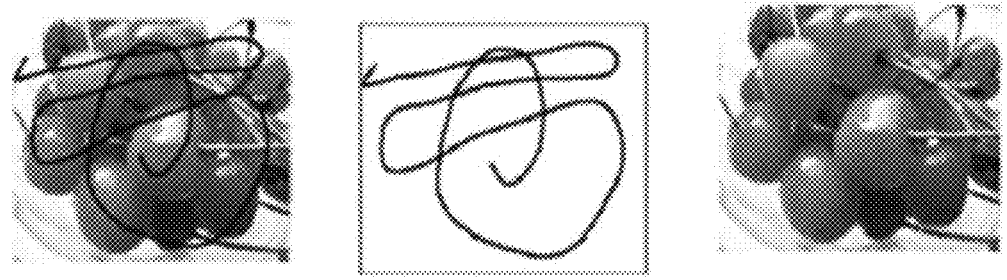
FIG. 2 illustrates a method for reconstructing a damaged image by using image inpainting.

FIG. 2 illustrates a method for reconstructing a damaged image by using image inpainting.

Referring to FIG. 2, mask information (center) may be used in order to reconstruct a damaged image (left) in the image inpainting. The mask information may indicate damaged regions in the damaged image. In the image inpainting, the damaged regions are reconstructed using color and structural information on boundaries of the damaged regions to generate a reconstructed image (right). However, the image inpainting may have defects when a damaged region is comparatively large. When a large damaged region is reconstructed using the image inpainting, a viewer may easily recognize the attempt to reconstruct the damaged region in an intermediate virtual viewpoint image.

Figure 3A:
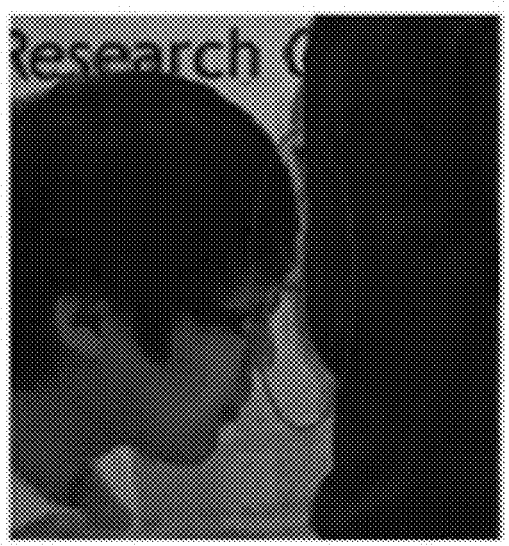
FIGS. 3A and 3B illustrate intermediate virtual viewpoint images reconstructed using different methods.
Figure 3B:

FIGS. 3A and 3B illustrate intermediate virtual viewpoint images reconstructed using different methods.

Referring to FIG. 3A, an intermediate virtual viewpoint image obtained after filling a hole-region by using image inpainting is illustrated. FIG. 3B illustrates an intermediate virtual viewpoint image synthesized after filling a hole-region using a boundary noise removal method. For example, the intermediate virtual viewpoint image of FIG. 3B may be obtained by using image synthesis software provided by an MEPG 3D video coding group. In the boundary noise removal method, a hole-region in an intermediate virtual viewpoint image may be filled with a pixel value of a background in a horizontal direction.

As shown in FIGS. 3A and 3B, a circled region in the intermediate virtual viewpoint image of FIG. 3A may be less natural than a circled region in the intermediate virtual viewpoint image of FIG. 3B. As can be seen, it is not effective to reconstruct a hole-region using only mask information.

In accordance with an embodiment of the present invention, a hole-region in an intermediate virtual viewpoint image may be reconstructed using a depth image, a mask image, and a color image of an intermediate virtual viewpoint image in order to produce a 3D image with a high image quality. Hereinafter, a method for filling a hole-region and a 3D video system in accordance with an embodiment of the present invention will be described.

Figure 4:
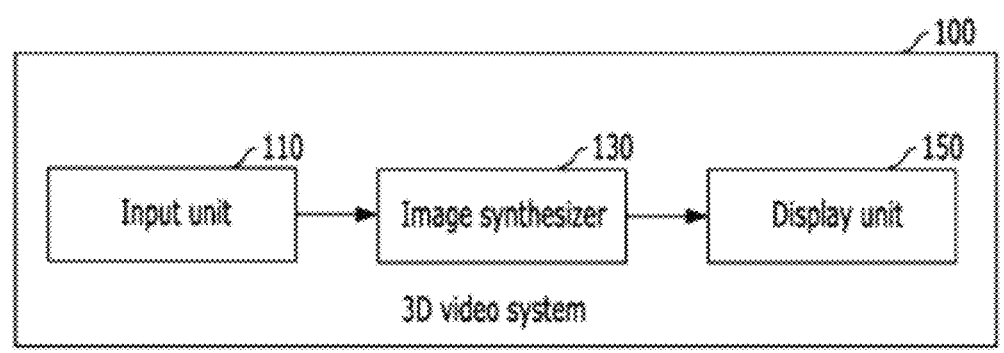
FIG. 4 illustrates a three-dimensional (3D) video system in accordance with an embodiment of the present invention.

FIG. 4 illustrates a 3D video system in accordance with an embodiment of the present invention.

In accordance with an embodiment of the present invention, the 3D video system may produce multi-viewpoint 3D images. The 3D video system may synthesize an intermediate virtual viewpoint image by using reference images and depth maps thereof and display the synthesized intermediate virtual viewpoint image with reference images. Hereinafter, the 3D video system will be described in more detail with reference to FIG. 4.

Referring to FIG. 4, the 3D video system 100 may include an input unit 110, an image synthesizer 130, and a display unit 150.

The input unit 110 may obtain a plurality of images each having a different viewpoint. For example, the input unit 110 may receive multi viewpoint image data and supplementary data such as depth maps and camera parameters from a plurality of multi viewpoint cameras (not shown).

The image synthesizer 130 may synthesize an intermediate virtual viewpoint image using at least one of the obtained images as a reference image and a depth image thereof. In more detail, the intermediate virtual viewpoint image may be synthesized using the depth images of the reference images. The depth image may be referred to as a depth map, and the depth map may include a depth value of each pixel in the reference views. Such a depth value of each pixel may be used with the reference image data to synthesize an intermediate virtual viewpoint image.

Furthermore, the image synthesizer 130 may detect a hole-region included in an intermediate virtual viewpoint image and fill the detected hole-region in the intermediate virtual viewpoint image. The hole-region may include hole-pixels. The filling of a hole-region may be accomplished by reconstructing a virtual image having a hole-region by calculating a depth value and a color value of each hole-pixel in the hole-region. In order to fill the hole-region, the image synthesizer 130 may use a depth image of an intermediate virtual viewpoint image, a mask image of an intermediate virtual viewpoint image, and a color image of an intermediate virtual viewpoint image. The mask image may be referred to as an alpha map. The alpha map may include alpha values obtained while synthesizing an intermediate virtual viewpoint image. For example, the alpha value may be 0 or 1. The alpha value of 0 may denote a hole-pixel included in a hole-region, and the alpha value of 1 may denote a normal pixel.

The display unit 150 may output, from the image synthesizer 130, the intermediate virtual viewpoint image reconstructed by the image synthesizer 130.

As described above, the 3D video system in accordance with an embodiment of the present invention may synthesize an intermediate virtual viewpoint image and fill a hole-region in the intermediate virtual viewpoint image based on the depth map, the alpha map, and the color image of the intermediate virtual viewpoint image. Accordingly, the 3D video system in accordance with an embodiment of the present invention may provide more nature and high quality 3D images.

Hereinafter, a method for filling a hole-region in accordance with an embodiment of the present invention will be described in detail with reference to FIGS. 5 to 7.

Figure 5:
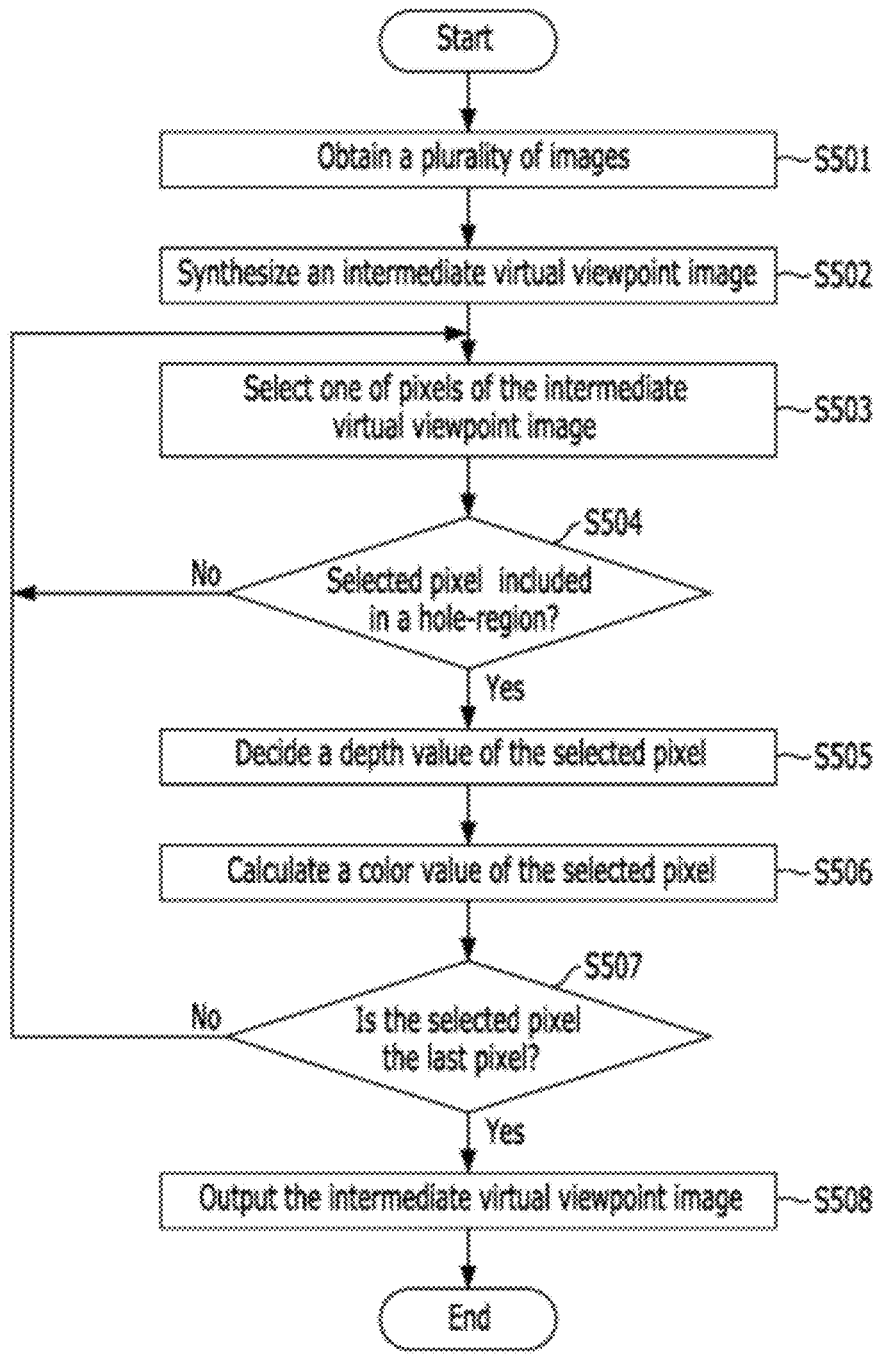
FIG. 5 illustrates a method for filling a hole-region, in accordance with an embodiment of the present invention.
Figure 6:
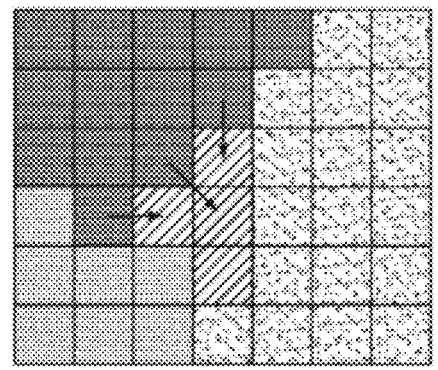
FIG. 6 is a diagram for describing determining a virtual depth value of each pixel in a hole-region, in accordance with an embodiment of the present invention.
Figure 7A:
FIG. 7A illustrates an intermediate virtual viewpoint image reconstructed using a typical method.

FIG. 5 illustrates a method for filling a hole-region, in accordance with an embodiment of the present invention. FIG. 6 illustrates determining a depth value of a hole-pixel in a hole-region, in accordance with an embodiment of the present invention. FIG. 7A illustrates an intermediate virtual viewpoint image reconstructed using a method in accordance with an embodiment of the present invention, and FIG. 7 illustrates an intermediate virtual viewpoint image reconstructed using a typical method.

Referring to FIG. 5, a plurality of images each having a different viewpoint may be obtained S501. For example, the input unit 110 may receive a plurality of images from a plurality of cameras (not shown) with supplementary data such as depth maps and camera parameters. Each of the plurality of images may be captured from different viewpoints.

An intermediate virtual viewpoint image may be synthesized using at least one of the obtained images as a reference image S502. While synthesizing the intermediate virtual viewpoint image, an alpha map and a depth map of the intermediate virtual viewpoint image may be created. As described above, the alpha map may be referred to as a mask image, and the depth map may be referred to as a depth image. The alpha map may indicate a hole-region in the intermediate virtual viewpoint image. The alpha map may include an alpha value for each pixel.

After synthesizing the intermediate virtual viewpoint image, a hole-region of the intermediate virtual viewpoint image may be reconstructed, as follows, in accordance with an embodiment of the present invention.

One of pixels in the intermediate virtual viewpoint image may be selected S503, and a determination may be made as to whether or not a selected pixel is included in a hole-region S504. For example, the image synthesizer 130 may determine whether or not an alpha value of the selected pixel is 0 based on the alpha map of the intermediate virtual viewpoint image. When the alpha value of the selected pixel is 0, the image synthesizer 130 may determine that the selected pixel is a hole-pixel included in the hole-region.

When the selected pixel is not a hole-pixel included in the hole-region (S504-NO), a next pixel of the intermediate virtual viewpoint image may be selected and the determination may be made as to whether the next pixel is a hole-pixel included in the hole-region S504.

On the contrary, when the selected pixel is a hole-pixel included in the hole-region (S504-YES), a depth value of the selected pixel may be decided S505.

For example, the image synthesizer 130 may select the smallest depth value from depth values of pixels adjacent to the selected pixel within a particular distance and decide the selected smallest depth value as the depth value of the selected pixel. The smallest depth value is selected as the depth value of the selected pixel because a region blocked by a foreground object is revealed in the intermediate virtual viewpoint image in most cases. Such a depth value of the selected pixel may be calculated using Eq. 1 below.

$$\begin{cases} \hat{d} = \min D(u, v) \\ D(u, v) \in W \end{cases} \quad \text{Eq. 1}$$

In Eq. 1, $\hat{d}$ denotes a depth value of a hole-pixel, $D(u,v)$ denotes a depth value of a pixel $(u,v)$, u denotes an x-coordinate value of a pixel, v denotes a y-coordinate value of a pixel, and W denotes a window that is a set of pixels adjacent to a corresponding pixel within a particular distance.

As shown in Eq. 1, the smallest depth value may be selected from among depth values $D(u,v)$ of pixels in a window W. Since a depth value is not assigned to hole-pixels of a hole-region, hole-pixels are not considered for selecting the smallest depth value.

As described above, the depth values of hole-pixels included in the hole-region of the intermediate virtual viewpoint image may be decided by using Eq. 1. FIG. 6 illustrates an example of deciding a depth value of pixels included in a hole-region of an intermediate virtual viewpoint image.

After obtaining the depth value of the selected pixel in the hole-region, a color value of the selected pixel may be calculated using a bilateral filter S506.

In accordance with an embodiment of the present invention, the hole-region may be filled by calculating a color value of the selected pixel based on the depth value of the selected pixel, which is calculated using Eq. 1, and depth values and color values of adjacent pixels. In order to obtain the color value of the selected pixel, a bilateral filter may be used. The bilateral filter may also apply a weight that changes according to a depth difference between a selected hole-pixel and pixels adjacent to the selected hole-pixel within a window and a weight according to a distance between a selected hole-pixel and pixels adjacent to the selected hole-pixel within the window.

For example, a comparatively larger weight may be applied to a pixel having a depth value similar to the depth value of the selected hole-pixel. On the contrary, a comparatively smaller weight may be applied to a pixel having a depth value significantly different from the depth value of the selected hole-pixel because a distance between objects becomes greater when a difference between depth values is great. At the same time, a comparatively larger weight may be applied to a pixel as the pixel is closer to a hole-pixel in a hole-region.

The color value of the selected pixel may be calculated based on Eq. 2 below.

$$C(x, y) = \frac{\sum_{u \in \vec{u}} \sum_{v \in \vec{v}} W(u, v, \hat{d}) \cdot C(u, v)}{\sum_{u \in \vec{u}} \sum_{v \in \vec{v}} W(u, v, \hat{d})} \quad \text{Eq. 2}$$

In Eq. 2, $c(x,y)$ denotes a color value of a corresponding hole-pixel, $W(u, v, \hat{d})$ denotes a weight varying according to a depth and a distance, $\hat{d}$ denotes a depth value of a corresponding hole-pixel, $C(u,v)$ denotes color values of pixels adjacent to the corresponding hole-pixel within a predetermined distance, u denotes an x-coordinate value of a pixel, and v denotes a y-coordinate value of a pixel Eq. 3 shows adjacent pixels $(u,v)$ separated from a hole-pixel $(x,y)$ in a hole-region at a distance r.

$$\vec{u} = \{x-r, \ldots, x+r\}$$

$$\vec{v} = \{y-r, \ldots, y+r\} \quad \text{Eq. 3}$$

In Eq. 3, $\vec{u}$ denotes a set of x-coordinate values of pixels separated from a hole-pixel $(x,y)$ in a hole-region at a distance r, and $\vec{v}$ denotes a set of y-coordinate values of pixels separated from a hole-pixel $(x,y)$ in a hole-region at a distance r.

Furthermore, the weight W may be expressed as follows in Eq. 4 below.

$$W(u, v, \hat{d}) = \exp\left(\frac{\|\hat{d}, D(u,v)\|^2}{2\sigma_D^2}\right) \exp\left(\frac{(x-u)^2 + (y-v)^2}{2\sigma_r^2}\right) \quad \text{Eq. 4}$$

In Eq. 4, x denotes an x-coordinate value of a hole-pixel, y denotes a y-coordinate value of the hole-pixel, D denotes a depth value difference between the hole-pixel and a corresponding pixel adjacent to the hole-pixel, r denotes a distance between the hole-pixel and a corresponding pixel adjacent to the hole-pixel, and σ denotes a standard deviation.

A color value of each pixel in the window may be calculated using Eq. 5 below.

$$C(u,v) = \alpha(u,v) \cdot I(u,v) \quad \text{Eq. 5}$$

In Eq. 5, $C(u,v)$ denotes color values of pixels $(u,v)$ adjacent to the corresponding hole-pixel within a predetermined distance, u and v denote an x-coordinate value and a y-coordinate value of a pixel, $\alpha(u,v)$ denotes alpha values of pixels $(u,v)$ adjacent to the corresponding hole-pixel within a predetermined distance, and $I(u,v)$ denotes color values pixels $(u,v)$ adjacent to the corresponding hole-pixel within a predetermined distance.

In calculating the color value, the current pixel may be filled with the calculated depth value and color value.

After calculating the color value of the selected pixel S506, a determination may be made as to whether the selected pixel is the last pixel S507. When the selected pixel is not the last pixel (S507-NO), a next pixel may be selected S503 and a determination may be made as to whether or not the next pixel is included in a hole-region S504.

On the contrary, when the selected pixel is the last pixel of the intermediate virtual viewpoint image, the intermediate virtual viewpoint image may be displayed through the display unit S508.

The displayed virtual viewpoint image may have an image quality further improved as compared to that reconstructed using a typical method such as image inpainting or a boundary noise removal method.

Figure 7B:
FIG. 7B illustrates an intermediate virtual viewpoint image reconstructed using a method in accordance with an embodiment of the present invention.

FIG. 7A illustrates an intermediate virtual viewpoint image reconstructed using a method in accordance with an embodiment of the present invention, and FIG. 7B illustrates an intermediate virtual viewpoint image reconstructed using a typical method.

FIG. 7A illustrates a synthesized image using image inpainting, and FIG. 7B illustrates a synthesized image using the method for filling a hole-region in accordance with an embodiment of the present invention. A circled region of FIG. 7B is much natural compared to a circled region of FIG. 7A.

As described above, a method for filling a hole-region and a 3D video system in accordance with an embodiment of the present invention may improve an image quality of an intermediate virtual viewpoint image having a hole-region, which is synthesized using reference images.

In accordance with embodiments of the present invention, the method for filling a hole-region may be realized as a program and stored in a computer-readable recording medium such as a CD-ROM, a RAM, a ROM, floppy disks, hard disks, magneto-optical disks, and the like. Since the process can be easily implemented by those skilled in the art to which the present invention pertains, further description will not be provided herein.

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for filling a hole-region of an image, the method comprising;
deciding a depth value of each hole-pixel included in the hole-region;
determining a color value of each hole-pixel included in the hole-region; and
reconstructing the hole-region by updating each hole-pixel based on respective decided depth values and respective determined color values,
wherein the color value of each hole-pixel included in the hole-region is determined by:

$$C(x, y) = \frac{\sum_{u \in \vec{u}} \sum_{v \in \vec{v}} W(u, v, \hat{d}) \cdot C(u, v)}{\sum_{u \in \vec{u}} \sum_{v \in \vec{v}} W(u, v, \hat{d})},$$

wherein $C(x,y)$ denotes a color value of a respective hole-pixel, $W(u,v,\hat{d})$ denotes a weight that varies according to a depth difference between the respective hole-pixel and adjacent pixels and a distance between the respective hole-pixel and the adjacent pixels, $\hat{d}$ denotes a depth value of the respective hole-pixel, $C(u,v)$ denotes color values of pixels adjacent to and within a desired distance from the respective hole-pixel, $u$ denotes an x-coordinate value, $v$ denotes a y-coordinate value, $\vec{u}$ denotes a set of x-coordinate values of pixels separated from a hole-pixel $(x,y)$ in a hole-region at a distance $r$, and $\vec{v}$ denotes a set of y-coordinate values of a pixels separated from the hole-pixel $(x,y)$ in a hole-region at a distance $r$.

2. The method of claim 1, wherein in the deciding the depth value of each hole-pixel, a smallest depth value is selected from depth values of pixels adjacent to and within a desired distance from the respective hole-pixel, and the selected smallest depth value is established as the decided depth value of the respective hole-pixel.

3. The method of claim 1, wherein the depth value of each hole-pixel in the hole-region is decided by:

$$\begin{cases} \hat{d} = \min D(u, v) \\ D(u, v) \in W, \end{cases}$$

wherein $\hat{d}$ denotes the depth value of a respective hole-pixel, $D(u,v)$ denotes the depth value of a pixel at location $(u,v)$, $u$ denotes an x-coordinate value of a pixel, $v$ denotes a y-coordinate value of a pixel, and W denotes a window that comprises a set of pixels adjacent to and located within a desired distance from the respective hole-pixel.

4. The method of claim 1, wherein in the determining the color value of each hole-pixel, the color value is calculated based on the depth value of the respective hole-pixel and depth values and color values of pixels adjacent to the respective hole-pixel.

5. The method of claim 1, wherein the weight $W(u,v,\hat{d})$ is determined by:

$$W(u, v, \hat{d}) = \exp\left(\frac{\|\hat{d}, D(u, v)\|^2}{2\sigma_D^2}\right) \exp\left(\frac{(x\ u)^2 + (y\ v)^2}{2\sigma_r^2}\right),$$

wherein $x$ denotes an x-coordinate value of the respective hole-pixel, $y$ denotes a y-coordinate value of the respective hole-pixel, D denotes a depth value difference between the respective hole-pixel and a pixel adjacent to the respective hole-pixel, $r$ denotes a distance between the respective hole-pixel and the pixel adjacent to the hole-pixel, and $\sigma$ denotes a standard deviation.

6. The method of claim 1,
wherein the color values of the pixels adjacent to the respective hole-pixel are determined by:

$$C(u,v) = \alpha(u,v) \cdot l(u,v),$$

wherein $\alpha(u,v)$ denotes an alpha value of a pixel $(u,v)$ adjacent to and within a desired distance from the respective hole-pixel, and
$l(u,v)$ denotes a color value of the pixel $(u,v)$ adjacent to and within the desired distance from the respective hole-pixel.

7. The method of claim 1, wherein the color value is determined by using a bilateral filter with a weight that changes according to a depth value difference between a respective hole-pixel and adjacent pixels and according to a distance between the respective hole-pixel and the adjacent pixels.

8. A method for synthesizing an image, the method comprising:
obtaining a plurality of images each having a different viewpoint;

synthesizing an intermediate virtual viewpoint image using depth maps of the obtained plurality of images; and filling a hole-region in the intermediate virtual viewpoint image using a color image of the ate virtual viewpoint image, a mask image indicating the hole-region in the intermediate virtual viewpoint image, and a depth image of the intermediate virtual viewpoint image, wherein the filling the hole-region comprises: deciding a depth value of each hole-pixel included in the hole-region of the intermediate virtual viewpoint image and calculating a color value of each hole-pixel included in the hole-region of the intermediate virtual viewpoint image using the decided depth values of the hole-pixels, depth values of pixels adjacent to the hole-pixels, and color values of the pixels adjacent to the hole-pixels, and wherein the color value of each hole-pixel included in the hole-region is determined by:

$$C(x, y) = \frac{\sum_{u \in \vec{u}} \sum_{v \in \vec{v}} W(u, v, \hat{d}) \cdot C(u, v)}{\sum_{u \in \vec{u}} \sum_{v \in \vec{v}} W(u, v, \hat{d})},$$

wherein C(x,y) denotes a color value of a respective hale-pixel, W(u,v,d̂) denotes a weight that varies according to a depth difference between the respective hole-pixel and adjacent pixels and a distance between the respective hole-pixel and the adjacent pixels, d̂ denotes a depth value of the respective hole-pixel, C(u,v) denotes color values of pixels adjacent to and within a desired distance from the respective hole-pixel, u denotes an x-coordinate value, v denotes a y-coordinate value, $\vec{u}$ denotes a set of x-coordinate values of pixels separated from a hole-pixel (x,y) in a hole-region at a distance r, and $\vec{v}$; denotes a set of y-coordinate values of a pixels separated from the hole-pixel (x,y) in a hole-region at a distance r.

9. The method of claim 8, wherein in the deciding the depth value of each hole-pixel:

a smallest depth value is selected from among depth values of pixels adjacent to and within a desired distance from a respective hole-pixel; and the selected smallest depth value is established as the decided depth value of the respective hole-pixel.

10. The method of claim 8, wherein in the calculating the color value of each hole-pixel:

a comparatively larger weight is applied to an adjacent pixel having a depth value substantially similar to a decided depth value of the respective hole-pixel;

a comparatively smaller weight is applied to an adjacent pixel having a depth value substantially different from a decided depth value of the respective hole-pixel; and a comparatively larger weight is applied to an adjacent pixel that is located proximate to the respective hole-pixel.

11. The method of claim 8, wherein in the calculating the color value of each hole-pixel, the color value of each hole-pixel is determined by using a bilateral filter based on the decided depth value of the respective hole-pixel, depth values of pixels adjacent to the respective hole-pixel, color values of pixels adjacent to the respective hole-pixel, and a weighting factor that changes according to a depth value difference between the respective hole-pixel and the adjacent pixels and according to a distance between the respective hole-pixel and the adjacent pixels.

12. An apparatus for producing three dimension images, the apparatus comprising:

an input circuit configured to obtain a plurality of images each having a different viewpoint;

an image synthesizing processor configured to receive the obtained plurality of images from the input circuit, synthesize an intermediate virtual viewpoint image using depth maps of the obtained plurality of images, and fill a hole-region in the intermediate virtual viewpoint image using a color image of the intermediate virtual viewpoint image, a mask image indicating the hole-region in the intermediate virtual viewpoint image, and a depth image of the intermediate virtual viewpoint image; and a display configured to display the intermediate virtual viewpoint image synthesized by the image synthesizer, wherein the image synthesizing processor is configured to decide a depth value of each hole-pixel included in the hole-region of the intermediate virtual viewpoint image and to calculate a color value of each hole-pixel included in the hole-region of the intermediate virtual viewpoint image using the decided depth values of the hole-pixels, depth values of pixels adjacent to the hole-pixels, and color values of the pixels adjacent to the hole-pixels, and wherein the color value of each hole-pixel included in the hole-region is determined by:

$$C(x, y) = \frac{\sum_{u \in \vec{u}} \sum_{v \in \vec{v}} W(u, v, \hat{d}) \cdot C(u, v)}{\sum_{u \in \vec{u}} \sum_{v \in \vec{v}} W(u, v, \hat{d})},$$

wherein C(x,y) denotes a color value of a respective hole-pixel, W(u,v,d̂) denotes a weight that varies according to a depth difference between the respective hole-pixel and adjacent pixels and a distance between the respective hole-pixel and the adjacent pixels, d̂ denotes a depth value of the respective hole-pixel, C(u,v) denotes color values of pixels adjacent to and within a desired distance from the respective hole-pixel, u denotes an x-coordinate value, v denotes a y-coordinate value, $\vec{u}$ denotes a set of x-coordinate values of pixels separated from a hole-pixel (x,y) in a hole-region at a distance r, and $\vec{v}$ denotes a set of y-coordinate values of a pixels separated from the hole-pixel (x,y) region at a distance r.

13. The apparatus of claim 12, wherein the image synthesizing processor is configured to:

select a smallest depth value from among depth values of pixels adjacent to and within a desired distance from a respective hole-pixel; and establish the selected smallest depth value as the decided depth value of the respective hole-pixel.

14. The apparatus of claim 12, wherein the image synthesizing processor is configure to decide the depth value of each hole-pixel by:

$$\begin{cases} \hat{d} = \min D(u, v) \\ D(u, v) \in W, \end{cases}$$

wherein $\hat{d}$ denotes the depth value of a respective hole-pixel, D(u,v) denotes the depth value of a pixel at location (u,v), u denotes an x-coordinate value of a pixel adjacent to the respective hole-pixel, v denotes a y-coordinate value of a pixel adjacent to the respective hole-pixel, and W denotes a window that comprises a set of pixels adjacent to and located within a desired distance from the respective hole-pixel.

15. The apparatus of claim 12, wherein the weight W(u, v, a) is determined by:

$$W(u, v, \hat{d}) = \exp\left(\frac{\|\hat{d}, D(u,v)\|^2}{2\sigma_D^2}\right)\exp\left(\frac{(x-u)^2+(y-v)^2}{2\sigma_r^2}\right),$$

wherein x denotes an x-coordinate value of the respective hole-pixel, y denotes a y-coordinate value of the respective hole-pixel, D denotes a depth value difference between the respective hole-pixel and a pixel adjacent to the respective hole-pixel, r denotes a distance between the respective hole-pixel and the pixel adjacent to the hole-pixel, and σ denotes a standard deviation.

16. The apparatus of claim 12, wherein the image synthesizer is configured to: determine the color value of each hole-pixel by using a bilateral filter that applies a weight that changes according to a depth value difference between a respective hole-pixel and adjacent pixels and according to a distance between the respective hole-pixel and the adjacent pixels.

* * * * *

UNITED STATES PATENT AND TRADEMARK OFFICE
CERTIFICATE OF CORRECTION

PATENT NO.          : 9,135,744 B2
APPLICATION NO.     : 13/247909
DATED               : September 15, 2015
INVENTOR(S)         : Yo-Sung Ho and Cheon Lee Page 1 of 1

It is certified that error appears in the above-identified patent and that said Letters Patent is hereby corrected as shown below:

In the Claims

In claim 12, column 12, line 50, "region" should be amended to --in a hole-region--.

Signed and Sealed this
Fifth Day of July, 2016

Michelle K. Lee
*Director of the United States Patent and Trademark Office*